US005105141A

United States Patent [19]

Ernest

[11] Patent Number: 5,105,141

[45] Date of Patent: Apr. 14, 1992

[54] DEVICE TO CONTROL THE SPEED OF TWO-PHASE OR THREE-PHASE MOTORS

[75] Inventor: Philippe Ernest, Fontenay le Fleury, France

[73] Assignee: General Electric CGR SA, Issy Les Moulineaux, France

[21] Appl. No.: 551,888

[22] Filed: Jul. 12, 1990

[30] Foreign Application Priority Data

Jul. 13, 1989 [FR] France ................................ 89 09546

[51] Int. Cl.5 ........................ H02P 05/40; H01J 35/10

[52] U.S. Cl. .................................... 318/805; 318/807; 363/132; 363/41; 378/93

[58] Field of Search ............... 318/747, 801, 807, 599, 318/905; 363/41, 42, 132; 378/131, 135; 373/93, 94

[56] References Cited

U.S. PATENT DOCUMENTS

| | | | |
|---|---|---|---|
| 4,006,391 | 2/1977 | Deering et al. | 318/599 |
| 4,774,448 | 9/1988 | Yoshitomi | 318/746 |
| 4,829,551 | 5/1989 | Resnick et al. | 378/131 |
| 4,849,871 | 7/1989 | Wallingford | 318/801 |

FOREIGN PATENT DOCUMENTS 1-64593 3/1989 Japan .

OTHER PUBLICATIONS

"PESC 1989 Record Volume II", IEEE Power Electronics Specialists Conference, pp. 570–578.

"Static Frequency Converter for Supplying an Asynchronous Two-Phase Motor", IEE Proceedings, pp. 57–60.

*Primary Examiner*—William M. Shoop, Jr.

*Assistant Examiner*—John W. Cabeca

*Attorney, Agent, or Firm*—Nils H. Ljungman & Associates

[57] ABSTRACT

Disclosed are a device and a method to control the speed of two-phase or three-phase A.C. motors by means of a three-phase converter. The switching-over instants of the switches of the converter for the control of a two-phase motor are computed so that the signals at the common points of each pair of switches are phase shifted with respect to one another and have no low-order harmonic components. The disclosed device and method are applicable to motors driving rotating anodes for X-ray tubes.

6 Claims, 8 Drawing Sheets

DEVICE TO CONTROL THE SPEED OF TWO-PHASE OR THREE-PHASE MOTORS

BACKGROUND OF THE INVENTION

The present invention concerns two-phase or three-phase AC motors and, more particularly, a device to control the speed of such motors.

The invention shall be described in its application to the field of medical radiology where it is necessary to control the rotational speed of the anode of an X-ray emitting tube. As shown schematically in FIG. 1, a tube such as this is generally formed like a diode, that is, with a cathode 11 and an anode 12 or anti-cathode, these two electrodes 11 and 12 being enclosed in a vacuum-tight casing 13 when enables the electrical insulation to be achieved between these two electrodes. The cathode 11 produces beam of electrons, and the anode 12 receives these electrons on a small area which is the focal spot from where the X-ray beams are emitted.

When the high supply voltage is applied to the terminals of the cathode 11 and the anode 12, so that the cathode is at the negative potential, a current called an anode current is set up in the circuit, through a generator 14 producing the high supply voltage. The anode current crosses the space between the cathode and the anode in the form of a beam of electrons which bombard the focal spot.

A small proportion (1%) of the energy spent to produce the electron beam is converted into X-rays. Hence, given also the high values of instantaneous power (of the order of 1 to 100 KW) and the small dimensions of the focal spot (of the order of one millimeter), manufacturers have long been making rotating anode X-ray tubes where the anode is put into rotation to distribute the thermal flux over a ring called a focal ring with a greater area than that of the focal spot, the usefulness thereof being all the greater as the rotation speed is high, generally between 3,000 and 12,000 rpm.

The rotating anode 12, which is of a standard type, has the general shape of a disk with an axis of symmetry 17 around which it is put into rotation by means of an electrical motor. The electrical motor has a stator 15 located outside the casing 13 and a rotor 16 mounted in the casing and positioned along the axis of symmetry 17, the rotor being mechanically fixed to the anode by means of a supporting shaft 18. This motor is generally of the asynchronous type so that it does necessitate the creation of an inductive field by the rotor. The energy dissipated in a tube such as this is high, and it is therefore designed to be cooled. To this end, the tube is enclosed in a chamber or sheath 19 wherein a cooling liquid such as oil, is made to flow.

The high-speed rotation of the anode results in fast wearing out of the bearings of the motor. Hence, to prolong their lifetime as well as to reduce the heat losses of the motor which are dissipated in the sheath enclosing the X-ray tube, the anode is not permanently driven at high speed. This means that there is provision for at least two speeds of rotation, a high speed for the radiological exposure time and a lower speed between two exposures, the latter speed being possibly zero.

Besides, in the prior art, the same X-ray tube can be used to create two different X-ray sources which correspond to different focal spots by their size and to different flow rates. This results in different operating conditions, and it is common to have a matching rotational speed for each type of focal spot. Thus, for a focal spot of 0.3 mm, the rotational speed will be 3000 rpm while it will be 9000 rpm for a focal spot of 0.1 mm wherein the energy is concentrated on a smaller area.

The graphs of FIG. 2 show, by way of example, two operating cycles of the rotating anode of an X-ray tube, one graph 20 for a 0.3 mm focal point and another graph 21 for a 0.1 mm. focal point. The two cycles are identical and comprise a first stage A which corresponds to the starting up of the motor, a second stage B for maintaining the speed (3,000 rpm or 9,000 rpm) and a third braking stage C which lasts until the motor is stopped.

The motors that are used to make the rotating anodes are generally of the two-phase type and the electrical diagram that enables an operating cycle to be done is, for example, that of FIG. 3. In this FIG. 3, the motor 30 is shown in the form of a winding called a main phase winding 31 and a winding called auxiliary winding 32 in series with a phase shift capacitor 33. For the frequency considered, this capacitor 33 achieves the supply in quadrature of both windings 31 and 32. These two windings 31 and 32 are supplied with a single-phase A.C. voltage 34 through a transformer 35 and relay contacts 36 and 37 series mounted on the supply conductors 38 and 39. The common point of the windings 31 and 32 is directly connected to the secondary winding of the transformer 35. Moreover, the two conductors 38 and 39 are connected by a conductor 29, positioned between the relay contacts 36 and 37.

When the relays 36 and 37 are actuated, the two windings 31 and 32 are supplied with the normal voltage by the conductor 38, and the motor 30 starts up (stage A). When the relay 36 is then released, the windings 31 and 32 are supplied with the reduced voltage by the conductor 39: this is the stage B.

To obtain the braking of the motor, it is planned to open the contacts of the relay 37 and to inject a D.C. current into the main winding 31, for example. To this effect, the two terminals of the winding 31 are connected to a rectifier circuit 40 by means of the contacts of a relay 41. Thus, when the relays 36 and 37 are deactivated while the relay 41 is actuated, a current flows in the main winding and brakes the motor 30.

With a device such as this for supplying the motor 30, this motor runs at a speed of 3,000 rpm when the supply frequency is 50 Hertz. To obtain a rotational speed of 9,000 rpm, it is enough to triple the frequency of the mains supply by using, for example, a saturated air-gap transformer and by changing the phase shift capacitor by means of a change-over switch (not shown).

To obtain rotational speeds of the motor that are different from those imposed by the mains (3,000 rpm or 9,000 rpm), it is necessary to use a converter. The use of a converter is also necessary when the supply is a D.C. supply, for example for battery-operated movable radiological instruments.

One of the ways adopted is to use a single-phase converter which supplies a two-phase motor, the auxiliary phase of which is in series with a phase shift capacitor. This approach has the drawback of requiring switch-over operations, so as to match the phase shift capacitors with the speed and to obtain braking. Furthermore, there is no optimization of the converter-motor unit for, particularly, on the one hard the capacitor achieves the desired phase shift with a low precision, depending on its own tolerance and on the tolerance of the motor and, on the other hand, it causes an increase in the current harmonics components in the auxiliary phase.

To overcome the drawbacks of this first approach two single-phase converters in quadrature and one two-phase motor without phase shift capacitor are used. The electrical circuit diagram is that of FIG. 4. The winding 31 of the main phase is supplied by a first converter 44 represented by four switches 45, 46, 47 and 48, while the winding 32 of the auxiliary phase is supplied by a second converter 49 represented by four switches 50, 51, 52 and 53. For a better understanding, each switch may be considered to consist a transistor or a thyristor associated with an antiparallel diode. A capacitor 54 makes the input filter of the converters 44 and 49 which are supplied with D.C. current by a source 43.

This second approach is a high-cost approach for it uses two converters. Hence, a third approach consists in the use of a motor 66, the stator of which enables a three-phase winding, this winding being supplied by a three-phase converter according to the diagram of FIG. 5. In this figure, the converter 55 has three pairs or couples of switches 56 and 57, 58 and 59, 60 and 61, for which each common point A, B or C is connected to a winding 62 for the switches 56 and 57, to a winding 63 for the switches 58 and 59 and to a winding 64 for the switches 60 and 61. In this schematic diagram, the filtering capacitor is referenced 65. The opening and closing of the switches 56 to 60 are controlled by a device 67 which gives control signals of said switches. If the control signals are considered to be such that the waveforms VA, VB, VC, measured between the common points A, B, C of the switches and the negative supply pole are given by the graphs of the FIGS. 6-*a*, 6-*t*, 6-*c* phase shifted by 120° with respect to one another. The graphs of FIGS. 6-*d*, 6-*e* and 6-*f* give the result of the combination of these waveforms with one another such that the FIG. 6-*d* corresponds to VA-VB, FIG. 6-*e* corresponds to VB-VC and 6-*f* corresponds to VC-VA. These waveforms, commonly called pseudosinusoidal waves, are phase shifted by 120 degrees with respect to one another.

In this third approach, the easiest embodiment of the three-phase coil of the motor enables an improvement in the performance characteristics of the motor, thus enabling a shorter speed build-up time (stage A). Furthermore, the operation of such a device leads to the concellation, from the motor, of the current harmonics components belonging to an order which is a multiple of three. These harmonics components, like the intermediate harmonics components, do not give any useful torque but, on the contrary, create stray currents and give rise to losses. Finally, a lightening of the input filter is obtained for the frequency of the ripple imposed by the three-phase motor is tripled. This reduces the value of the capacitance of the filtering capacitor 65.

However, such an approach can be implemented only if the stator has a number of notches which is a multiple of three so as to enable a three-phase winding.

Furthermore, in view of the use of two-phase motors to date, the compatibility of the speed control device with this type of motor must be preserved.

SUMMARY OF THE INVENTION

The aim of the present invention, therefore, is to make a motor speed control device which can be connected either to two-phase motor or to a three-phase motor.

To this effect, the control device includes a three-phase converter which may be connected in a known way to a three-phase motor and connected in a particular way, according to the invention, to a two-phase motor. Furthermore, the control of the switches of the converter is achieved in a particular way so as to eliminate all or a part of the harmonic components considered to be inconvenient.

The invention pertains to a device for the control of a two-phase motor comprising a main phase winding and an auxiliary phase winding, wherein said device comprises a converter circuit of the three-phase type comprising a pair of switches per phase, the common points of each pair being connected, one to a main phase winding, another to the auxiliary phase winding and the last one to the common point of said windings, and wherein the opening and closing of the switches are controlled by the signals given by a control circuit so that the waveforms at the common points of each pair of switches are phase shifted by 90° with respect to each other.

The control device is also one wherein the control signals given by the control circuit are such that the waveforms at the fundamental frequency at the common points are sampled by signals for which the switching-over instants are, in one period, symmetrical with respect to the phase at 90° and inverted with respect to the phase at 180° so as to eliminate the even order spectral components.

The device therefore enables the supply of either a three-phase motor or a two-phase motor in determining the fundamental wave and in controlling the harmonic waves applied to the motor depending on its nature.

To do so, the control device gives control signals to the switches such that the waveforms at the common points A, B, C are adequately sampled.

This sampling is done at instants such that, in one period, they are deduced from those present in the first quarter by symmetry for the second quarter and complementation for the second half of the period. These properties of symmetry ensure that there are no even order spectral components.

The n switching-over instants placed on the first quarter of a cycle enable the elimination of $(n-1)$ odd order spectral components. They are then determined by the resolving of a system of n equations with n unknown quantities formed by the terms of the Fourier series expansion of the wave thus synthesized. Since this system has numerous solutions, it is possible to optimize the final harmonic content by the particular choice of one of them.

The states of the switches of the converter, thus determined over a period, are recorded in a memory. These n switching-over instants are computed for a number m of fundamental frequencies. Their values are recorded in distinct parts of a memory of the circuit giving the control signals for the switches of the converter and each part of said memory is read at a speed corresponding to the fundamental frequency selected for the computation of the switching-over instants.

BRIEF DESCRIPTION OF THE DRAWINGS

Other features and advantages of the present invention will appear from the following description of a particular embodiment, said description being made in relation to the appended drawings, of which:

FIGS. 1 to 6, which correspond to the prior art recognized in the preamble, shall not be further described.

DESCRIPTION OF PREFERRED EMBODIMENTS

Figure 7:
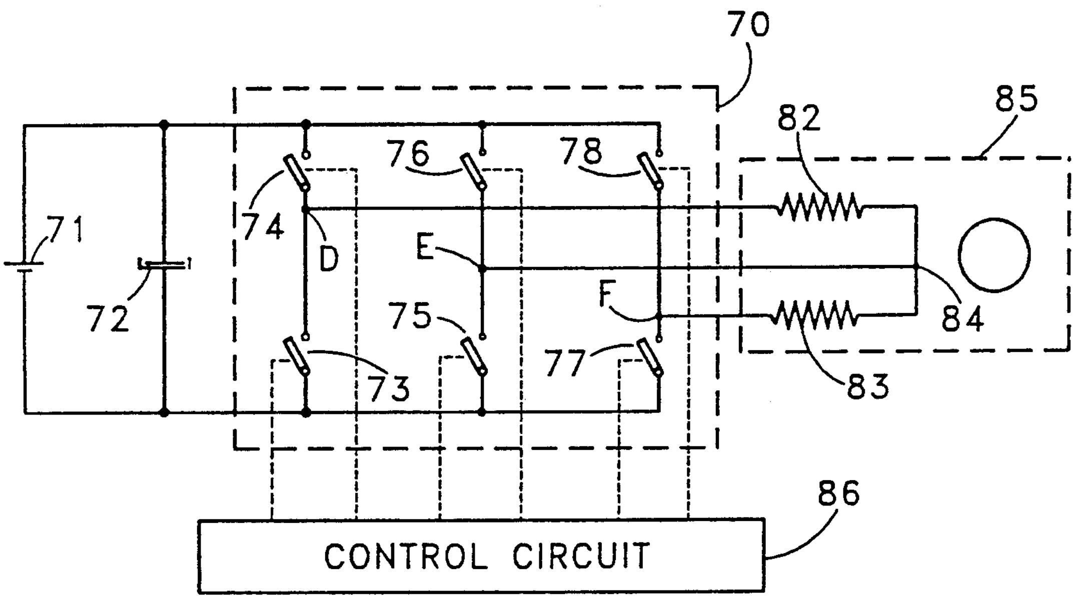
FIG. 7 is a schematic diagram of a two-phase motor supplied by a three-phase converter according to the present invention.
Figure 8A:
FIGS. 8-*a* to 8-*e* are graphs showing the waveforms given by the three-phase converter 70 of FIG. 7.
Figure 8B:
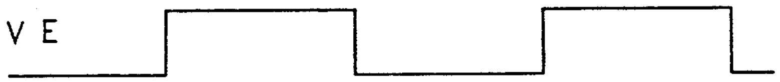
Figure 8C:
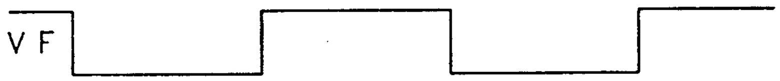
Figure 8D:
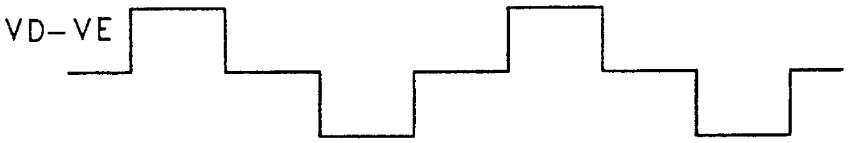
Figure 8E:
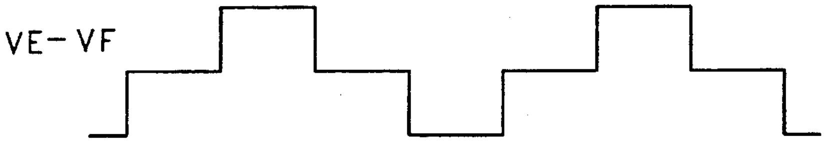

FIG. 7 is the schematic diagram of a device, according to the invention, to control the speed of a two-phase motor 85, said motor comprising a main phase winding 82 and an auxiliary phase winding 83. This device has a three-phase converter 70 which is supplied with D.C. or direct current by a source 71 and is controlled by a circuit 86. A capacitor 72 is used as a filtering element. The converter 70 has three pairs or couples of switches 73 and 74, 75 and 76, 77 and 78, each common point D, E and F of which is respectively connected to the main phase winding 82, the common point 84 of the two windings and the auxiliary phase winding 83.

The opening and closing of the switches 73 to 78 are controlled by a circuit 86 which gives signals to control said switches. These switches 73 to 78 are preferably formed by standard electronic components such as transistors or thyristors associated with inverted parallel diodes.

The control pulses for the switches 73 to 78 should be such that the voltage applied to the auxiliary phase winding 83 is phase shifted by 90° with respect to that applied to the main phase winding 82. Furthermore, these voltages should contain no low-order harmonics components that do not contribute to increasing the driving torque, it being known that the high-order harmonics components are not troublesome because the corresponding currents are low due to the high value of the self-induction coils of the windings 82 and 83 for these high frequencies.

Besides, to reduce the supply current in the speed-maintaining stage B, the duration of the pulses has to be modified without introducing low-order harmonics components.

The graphs of FIGS. 8-*a*, 8-*b* and 8-*c* show, as a function of time, the waveforms VD, VE and VF in voltages obtained respectively at the common points D, E and F of the pairs of switches (73, 74), (75, 76) and (77, 78). These are rectangular pulses that are phase-shifted by 90° with respect to each other. The voltage that is applied to the main phase winding 82 results from the difference (VD–VE) (FIG. 8-*d*) while the voltage that is applied to the auxiliary phase winding 83 results from the difference (VE–VF) (FIG. 8-*e*). The comparison of the graphs of FIGS. 8-*d* and 8-*e* shows that the waves applied to the windings 82 and 83 are pseudosinusoidal and are phase shifted by 90° with respect to each other, which is the goal sought.

However, waveforms (VD–VE) and (VE–VF) such as these lead to harmonics which have to be got rid of.

The Fourier series expansion of the waves (VD–VE) and (VE–VF) of the FIGS. 8-*d* and 8-*e* shows that their harmonic contents, expressed by the ratios in percentage of the root mean square voltages of the harmonics and of the fundamental current are as follows:

| | | | |
|---|---|---|---|
| Harmonic 3 | (H 3) | 33% | 0% |
| Harmonic 5 | (H 5) | 20% | 20% |
| Harmonic 7 | (H 7) | 14% | 14% |
| Harmonic 9 | (H 9) | 11% | 0% |
| Harmonic 11 | (H 11) | 9% | 9% |
| Harmonic 13 | (H 13) | 8% | 8% |

The last column to the right gives the harmonic contents in the case of the waveforms (VA–VB), (VB–VC) and (VC–VA) of the FIGS. 6-*d*, 6-*e* and 6-*f*, supplying the three-phase motor.

The harmonic currents superimposed on the useful fundamental current are detrimental to the converter and especially to the motor, for they reduce the useful flux and cause the motor to get heated up. It is therefore important to get rid of them.

However, it must be noted that, for the high order harmonics, for example greater than 13, the corresponding voltages are filtered by the induction coils of the windings which have high values at these frequencies so that the corresponding currents are low and their harmful effects are negligible.

Besides, during the speed-maintaining stage B, the driving torque should compensate only for the load moment so that the motor needs to be supplied only with reduced voltage. This reduced voltage is generally obtained by a chopping of the waveforms VD, VE and VF by means of a signal having a frequency greater than the fundamental frequency. The result thereof, then, is an increase in the harmonic content. The invention proposes to control the harmonics by determining the switching-over instants of the switches 73 to 78 so as the get rid of low-order harmonics. This is done by computation on the basis of the Fourier series expansion of the voltages VD, VE and VF which would be sampled by a waveform shown in FIG. 9. This sampling waveform has the particular characteristics which are the following:

it corresponds to an odd periodic function with a period T and with a mean value of zero;

during a period T, it is symmetrical with respect to the axes defined by the 90° and 270° angles and is inverted with respect to the axes defined by the 180° and 360° angles.

The Fourier series expansion of a periodic function with a period T is given by the formula:

$$f(\Theta) = a_0 + \sum_{1}^{\infty} a_n \cos n\Theta + \sum_{1}^{\infty} b_n \sin n\Theta$$

with $\Theta = wt$ and $w = 2\pi/T$

When this periodic function is odd and has a zero mean value, its Fourier series expansion becomes:

$$f(\Theta) = \Sigma b_n \sin n\Theta$$

and the coefficients $b_n$ are given by:

$$b_n = \frac{1}{2\pi}\int_0^{2\pi} f(\Theta)\sin n\Theta\, d\Theta$$

Figures 9A, 9B:
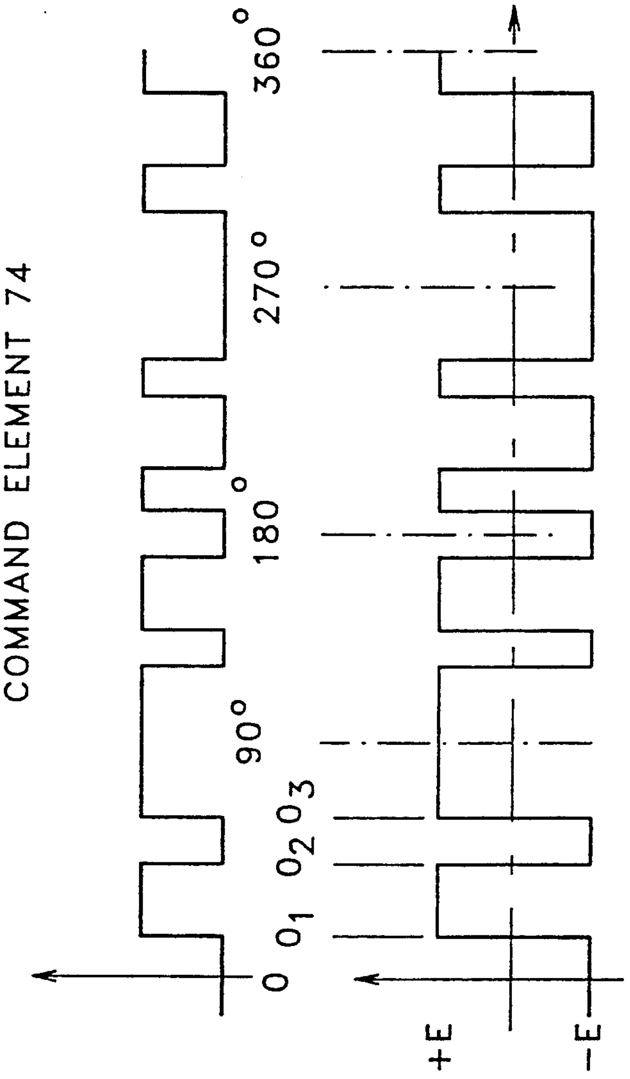
FIGS. 9*a* and 9*b* are graphs showing the sampling waveform of the fundamental signal according to the present invention.

If the FIG. 9-*a* is considered to represent the control sequence for the switch 74 of FIG. 7, complementary to that of the switch 73, then FIG. 9-*b* represents the voltage taken at the point D with respect to a fictitious point of potential E which is half that of the D.C. supply voltage with a value 2E.

In the case of the waveform of FIG. 9-*b*, the fundamental $b_1$ and the harmonics $b_n$ are given by:

$$b_1 = \frac{4E}{\pi}\left(-\frac{1}{2} + \cos\Theta_1 - \cos\Theta_2 + \cos\Theta_3\right)$$

$$b_n = \frac{4E}{n\pi}\left(-\frac{1}{2} + \cos n\,\Theta_1 - \cos n\,\Theta_2 + \cos n\Theta 3\right)$$

n being an odd number 3, 5, 7, 9 . . .

These equations have general application depending on the number of angles $\Theta_1$, $\Theta_2$, $\Theta_3$, $\Theta_4$ . . . $\Theta_1$, $\Theta_2$ and $\Theta_3$, are determined as a function of:

the value of the fundamental $b_1$ desired, a criterion of minimization of the harmonics.

This criterion may be, for example, the cancellation of the first two harmonics, namely $b_3$ and $b_5$ for a two-phase motor and $b_5$ and $b_7$ for a three-phase motor.

In the case of a two-phase motor, the following system of equations is then resolved:

$$\frac{4E}{\pi}\left(-\frac{1}{2} + \cos\ \Theta_1 - \cos\ \Theta_2 + \cos\ \Theta_3\right) = \text{Fundamental}$$

$$\frac{4E}{3\pi}\left(-\frac{1}{2} + \cos 3\,\Theta_1 - \cos 3\,\Theta_2 + \cos 3\,\Theta_3\right) = 0$$

$$\frac{4E}{5\pi}\left(-\frac{1}{2} + \cos 5\,\Theta_1 - \cos 5\,\Theta_2 + \cos 5\,\Theta_3\right) = 0$$

The criterion may be different: for example, tolerating a harmonic percentage specified for each order up to a certain order. It is clear that if it is desired to cancel three coefficients $b_n$, it would be necessary to choose a sampling waveform having switching-over instants at the angles $\Theta'_1$, $\Theta'_2$, $\Theta'_3$ and $\Theta'_4$, and to compute these angles by means of a system of four equations as defined above.

The computation of the angles $\Theta_1$, $\Theta_2$ and $\Theta_3$ through the above-defined system of equations is done by a computer, for example by successive approximations. The values of $\Theta_1$, $\Theta_2$ and $\Theta_3$ therefore define the waveform which must be obtained at the point D, for example, of FIG. 7. The waveforms at the points E and F are deduced from that at D by a 90° offset. In a practical way, the states of the switches of the converter over one period, with the switching-over operations at the angles $\Theta_1$, $\Theta_2$ and $\Theta_3$ thus determined and the necessary phase shifts are recorded in a memory of the control circuit 86 of FIG. 7, and the cyclical reading of this memory enables the controlling of the switches 73 to 78.

The variation in speed can be obtained either continuously, by variation of the frequency of the reading signal, or discretely by computing the programming on a number of steps corresponding to a fixed frequency of the reading signal and at the desired speed.

Figure 1:
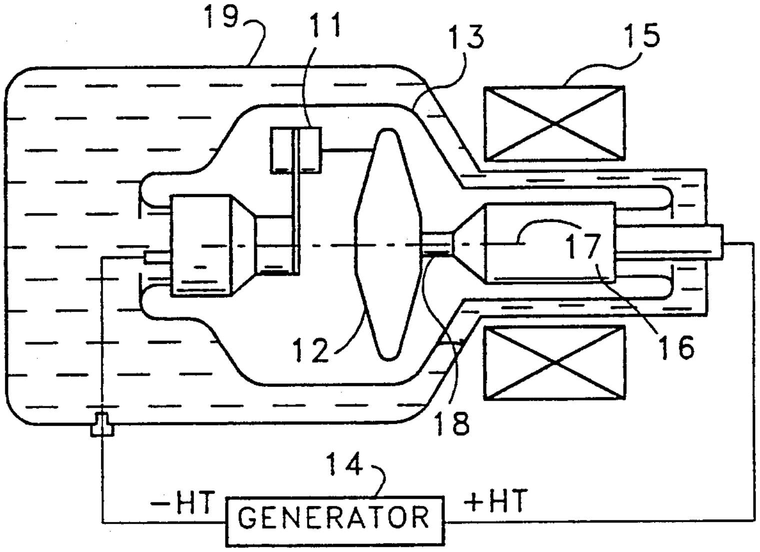
FIG. 1 is a simplified drawing of an X-ray tube.
Figure 2:
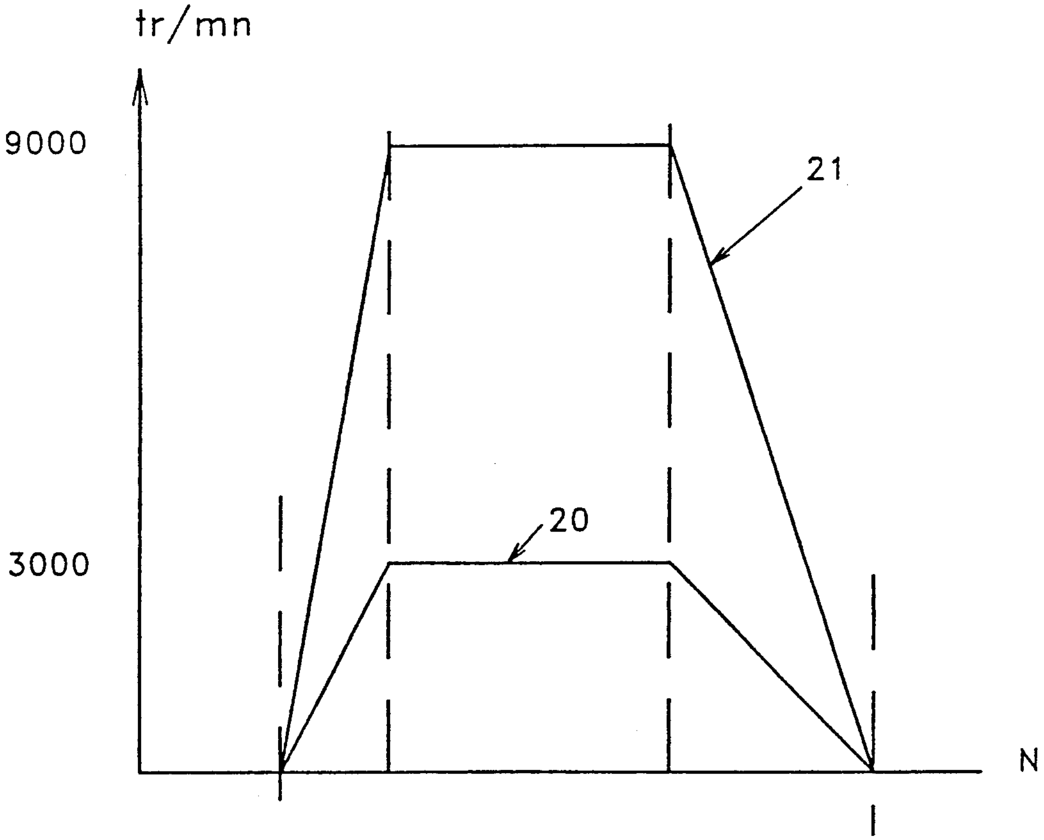
FIG. 2 is a graph showing two working cycles of an anode motor of an X-ray tube.
Figure 3:
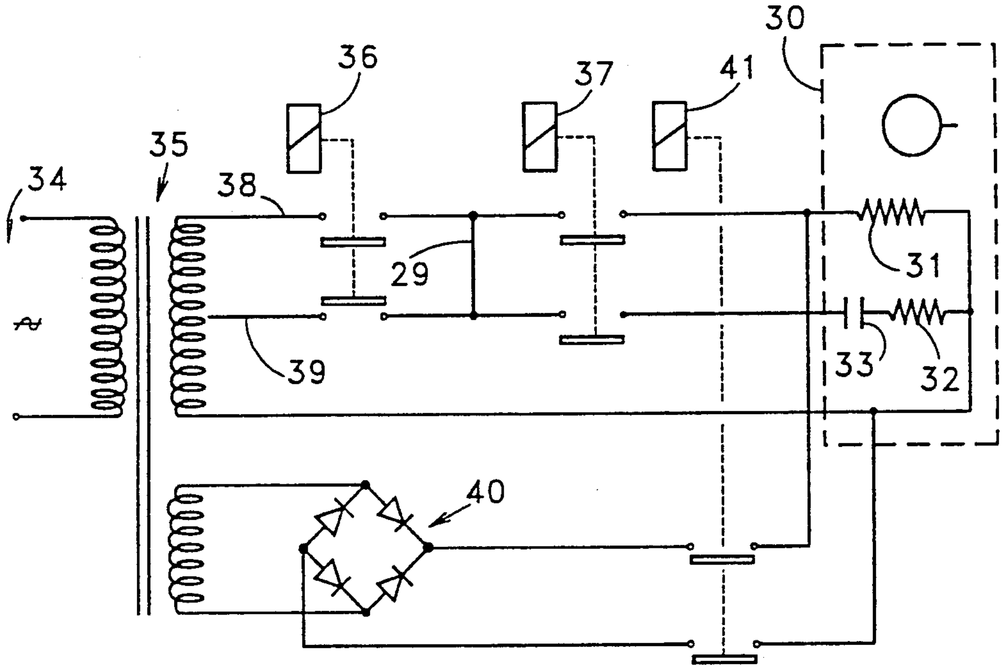
FIG. 3 is an electrical diagram of the supply of a two-phase motor of an X-ray tube anode.
Figure 4:
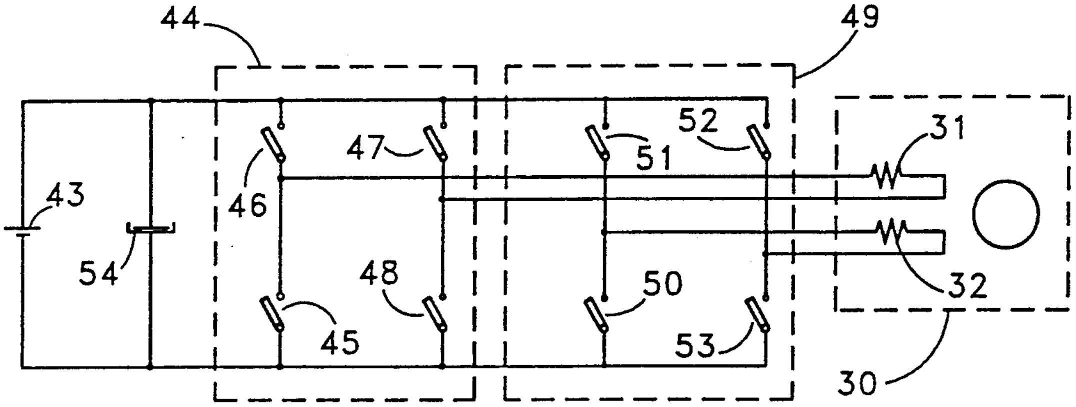
FIG. 4 is a schematic diagram of a two-phase motor supplied by two single-phase converters in quadrature.
Figure 5:
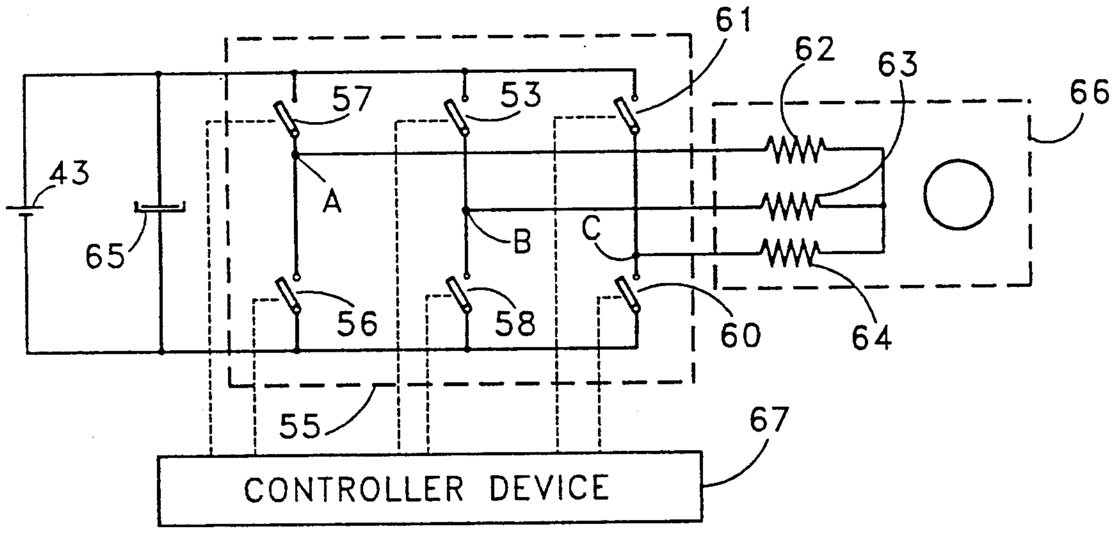
FIG. 5 is a schematic diagram of a three-phase motor supplied by a three-phase converter.
Figure 6A:
FIG. 6-*a* to 6-*f* are graphs showing the waveforms given by the three-phase converter 55 of FIG. 5.
Figure 6B:
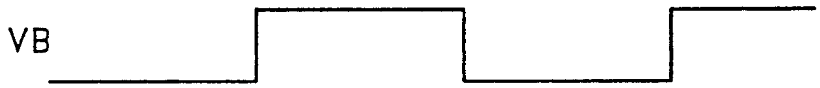
Figure 6C:
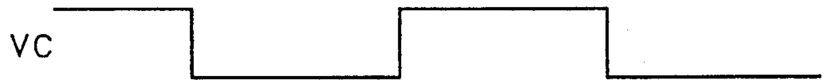
Figure 6D:
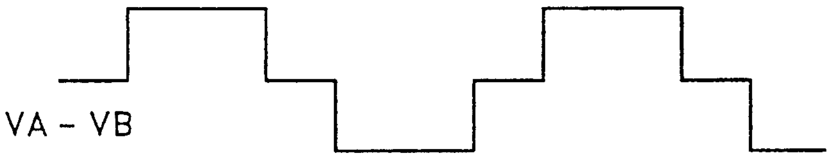
Figure 6E:
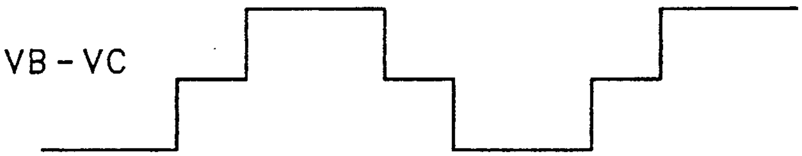
Figure 6F:
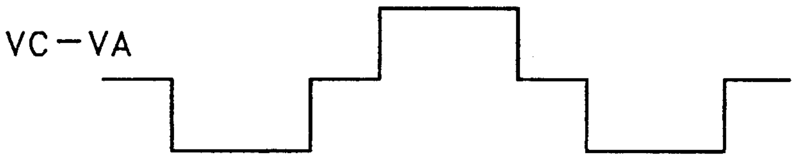

The invention that has just been described thus enables the control of a two-phase motor by means of a three-phase converter 70, with cancellation of the most troublesome harmonics by a computation of the values $\Theta_1$, $\Theta_2$, $\Theta 3_3$ . . . By choosing different switching-over values $\Theta''_1$, $\Theta''_2$ and $\Theta''_3$, which are determined in the same way, the same converter 70 can make a three-phase motor rotate with the undesirable harmonics eliminated. These values $\Theta''_1$, $\Theta''_2$, $\Theta''_3$. . . are recorded in another memory of the circuit 70, and their cyclical reading enables the performing of another sequence of operations for changing over the switches 73 to 78, in assuming that the points D, E and F are connected to the windings of a three-phase motor according to the diagram of FIG. 5 for the points A, B and C.

Figure 10:
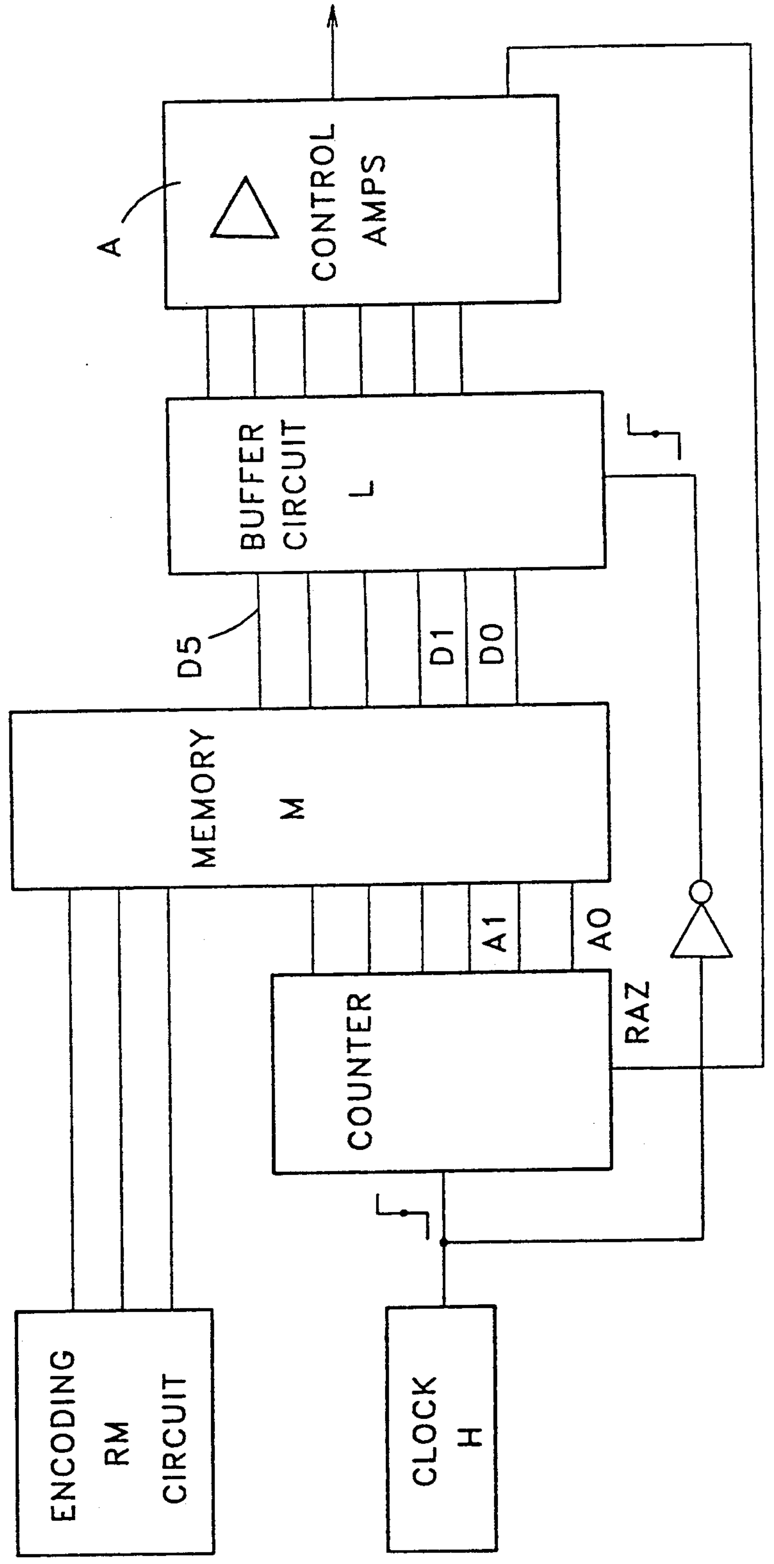
FIG. 10 is a functional diagram of a control circuit of a converter according to the present invention.

The control device of the switches is preferably of the type described in FIG. 10. In this figure, a counter C, periodically reset (RAZ) sends address signals A0, A1 . . . to a memory M. This dispatching is done at the rate given by a clock H. The values of the addresses get incremented with the counter. In response to these addresses, the memory delivers instructions D0, D1 to a buffer circuit L. The buffer circuit L is also controlled by the clock H (through an inverter). The buffer circuit L is connected, at its output, to a circuit A of control amplifiers for the switches (releasing of the thyristor gates). An encoding circuit RM, for the operating state of the motor, enables the selection of an adequate programming of the memory M to obtain the voltage and speed that are desired and are appropriate to the type of motor (two-phase or three-phase).

The circuit of FIG. 10 works as follows. The instructions given by the memory are identical to one another throughout the durations of the periods. These instructions therefore change value at the instants $\Theta_1$, $\Theta_2$, $\Theta_3$ . . .

In one example, the memory M has six outputs D0 to D5 (to control all six switches) which, depending on the instruction, may assume a 0 state (corresponding to the opening of a switch) or a 1 state (closing of a switch). In this way, the switches corresponding to a phase for a chosen mode may be controlled at the rate of a clock. In practice, the memories available have eight outputs. In this way, an additional output, is available to command the resetting of the counter. This occurs simply when the counter delivers an address corresponding to the end of a cycle.

As for the braking of the anode, it will be recalled that it is enough to apply a direct current to the main winding. In practice, the control circuit of FIG. 10 is also used for this purpose. In this case, by means of the memory RM, one of the pages of the memory M is selected so that the amplifiers A controls the converter like a chopper. This means that, in one or more phases of the motor, a pseudo-direct current is obtained, and this current is at any rate always oriented in the same direction. The control circuit of FIG. 10 can thus judiciously fulfil this role too.

What is claimed is:

1. A method for controlling the speed of a two phase motor having at least a main phase winding and an auxiliary phase winding comprising the steps of:

positioning a switching means between a power source and each phase winding of the polyphase motor;

opening and closing the switching means to control the speed of the motor such that the voltage applied to the respective phase windings of the motor are represented by rectangular waveforms pseudosinusoidal solely between two voltage levels;

phase shifting the waveforms a preselected degree with respect to each other;

selecting at least one order of harmonics to be cancelled from the voltage waveforms applied to the phase windings;

thereafter computing the value of the harmonic coefficients for the voltage waveforms applied to the phase windings;

computing the value of the phase angles of the voltage waveforms shifted a preselected degree to provide harmonic coefficients of zero for the selected order of harmonics to be cancelled;

recording the values of the computed phase angles in the memory of a computer;

reading the memory of the computer for selecting the time intervals to actuate the switching means at the computer phase angles to suppress the selected order of harmonics;

actuating the switching means at the computer phase angles to obtain phase shifting of the voltage waveforms to suppress the selected order of harmonics;

actuating said plurality of pairs of switches by said converter circuit such that the voltage applied to the auxiliary phase winding is phase shifted with respect to the voltage applied to the main phase winding to suppress the occurrence of low-order harmonic components in the current to the motor;

cancelling from the current to the motor harmonic components belonging to an order being a multiple of three;

connecting the main phase winding to a first point common to a first pair of switches;

connecting the auxiliary phase winding to a second point common to a second pair of switches;

connecting a common point between the connection of the main phase winding to the auxiliary phase winding to a third point common to a third pair of switches; and cancelling the third harmonic and the fifth harmonic in the two phase motor.

2. The method according to claim 1, further including:

opening and closing the pairs of switches by signals generated by the control circuit so that the voltage waveforms at the common points of each pair of switches are phase shifted a preselected angle with respect to each other.

3. The method according to claim 2, further including:

shifting the voltage waveforms at the common points of each pair of switches 90° with respect to each other.

4. The method according to claim 1, further including:

sampling the voltage waveforms at a fundamental frequency at the common points;

generating control signals by a control circuit in response to sampling the voltage waveforms; and identifying switching-over time periods for the pairs of switches when in one period the voltage waveforms are symmetrical with respect to the phase at 90° and are inverted with respect to the phase at 180° to suppress the even order spectral components in the current.

5. A method for controlling the speed of a two phase polyphase motor having at least a main phase winding and an auxiliary phase winding comprising the steps of:

positioning a switching means between a power source and each phase winding of the polyphase motor;

opening and closing the switching means to control the speed of the motor such that the voltage applied to the respective phase windings of the motor are represented by rectangular waveforms pseudosinusoidal solely between two voltage levels;

phase shifting the waveforms a preselected degree with respect to each other;

selecting at least one order of harmonics to be cancelled from the voltage waveforms applied to the phase windings;

thereafter computing the value of the harmonic coefficients for the voltage waveforms applied to the phase windings;

computing the value of the phase angles of the voltage waveforms shifted a preselected degree to provide harmonic coefficients of zero for the selected order of harmonics to be cancelled;

recording the values of the computed phase angles in the memory of a computer;

reading the memory of the computer for selecting the time intervals to actuate the switching means at the computed phase angles to suppress the selected order of harmonics;

actuating the switching means at the computed phase angles to obtain phase shifting of the voltage waveforms to suppress the selected order of harmonics;

actuating said plurality of pairs of switches by said converter circuit such that the voltage applied to the auxiliary phase winding is phase shifted with respect to the voltage applied to the main phase winding to suppress the occurrence of low-order harmonic components in the current to the motor;

cancelling from the current to the motor harmonic components belonging to an order being a multiple of three;

connecting the main phase winding to a first point common to a first pair of switches;

connecting the auxiliary phase winding to a second point common to a second pair of switches;

connecting a common point between the connection of the main phase winding to the auxiliary phase winding to a third point common to a third pair of switches;

cancelling the third harmonic and the fifth harmonic in a two phase motor;

generating control signals by the control circuit to sample the voltage waveforms at the common points for the first, second and third pairs of switches;

sampling the voltage waveforms present at a first preselected time period in a first quarter and a third quarter of symmetry of a voltage waveform cycle;

thereafter sampling the voltage waveforms present at a second preselected time period in a third and fourth quarter of symmetry of the voltage waveform cycle;

comparing the voltage waveforms sampled at the first and second time periods to determine if the voltage waveforms are complementary to ensure the absence of even order spectral components in the current to the motor;

determining the n switching-over time periods on the first quarter of the voltage waveform cycle to suppress the occurrence of $(n-1)$ odd order spectral components in the current to the motor;

computing the n switching-over time periods for a number m of fundamental frequencies;

recording the n switching-over time periods in the memory of the computer;

reading the memory of the computer at a speed corresponding to the fundamental frequency selected for computing the switching-over time periods; and actuating the switching means to generate closing of the switches at the computed switching-over time periods.

6. Apparatus for controlling the speed of a two phase polyphase motor having at least a main phase winding and an auxiliary phase winding comprising:

a voltage source;

a converter circuit connected between said voltage source and the motor;

said converter circuit including a plurality of pairs of switches, each pair of switches being connected to a phase winding of the motor;

each pair of said switches having a common point being connected, one to a main phase winding, one to an auxiliary phase winding and one to a point common to the main phase winding and auxiliary phase winding;

a control circuit for opening and closing said switches by supplying command signals thereto such that the voltage applied at the common points of each pair of switches is represented by a rectangular waveform pseudosinusoidal solely between two voltage levels and phase shifted a preselected degree with respect to each other;

computer means for determining the values of the phase angles for shifting the waveforms a preselected degree with respect to each other to provide a harmonic coefficient of zero for cancelling the third and fifth order or harmonics;

memory means for recording the values of the computed phase angles;

means connected to said control circuit and said memory means for actuating said control circuit to open and close said pairs of switches at preselected phase angles in the voltage waveforms to selectively shift the voltage waveforms to eliminate the third and fifth order of harmonics;

a first pair of switches connected to the main phase winding;

a first point D common to said first pair of switches;

a second pair of switches connected to the auxiliary phase winding;

a second point E common to said second pair of switches;

a common point between the connection of the main phase winding to the auxiliary phase winding;

a third point F common to a third pair of switches;

said third point F being connected to said common point between said main phase winding and said auxiliary phase winding;

said command signals supplied by said central circuit open and close said first, second and third pairs of switches at preselected switching-over time periods so that the voltage waveforms supplied to the motor are phase shifted a preselected angle with respect to each other; and said first, second, and third pairs of switches are opened and closed so that the voltage waveforms at said first, second, and third points common to said pairs of switches, respectively, are phase shifted 90° with respect to each other.

* * * * *

UNITED STATES PATENT AND TRADEMARK OFFICE
CERTIFICATE OF CORRECTION

PATENT NO. : 5,105,141

DATED : April 14, 1992

INVENTOR(S) : Philippe ERNEST

It is certified that error appears in the above-identified patent and that said Letters Patent is hereby corrected as shown below:

In column 3, line 33, after '6-a,', delete "6-t," and insert --6-b,--.

In column 3, line 33, after '6-c', insert --, they are square signals--.

In column 8, line 45, after 'a', delete "0" and insert --0--.

In column 8, line 46, after the second occurrence of 'a', delete "1" and insert --1--.

Signed and Sealed this

Sixteenth Day of November, 1993

*Attest:*

BRUCE LEHMAN

*Attesting Officer*

*Commissioner of Patents and Trademarks*